April 11, 1933.  L. SAIVES  1,903,635
METHOD OF OPERATING LOCOMOTIVES HAVING INTERNAL COMBUSTION ENGINES
Filed March 12, 1932
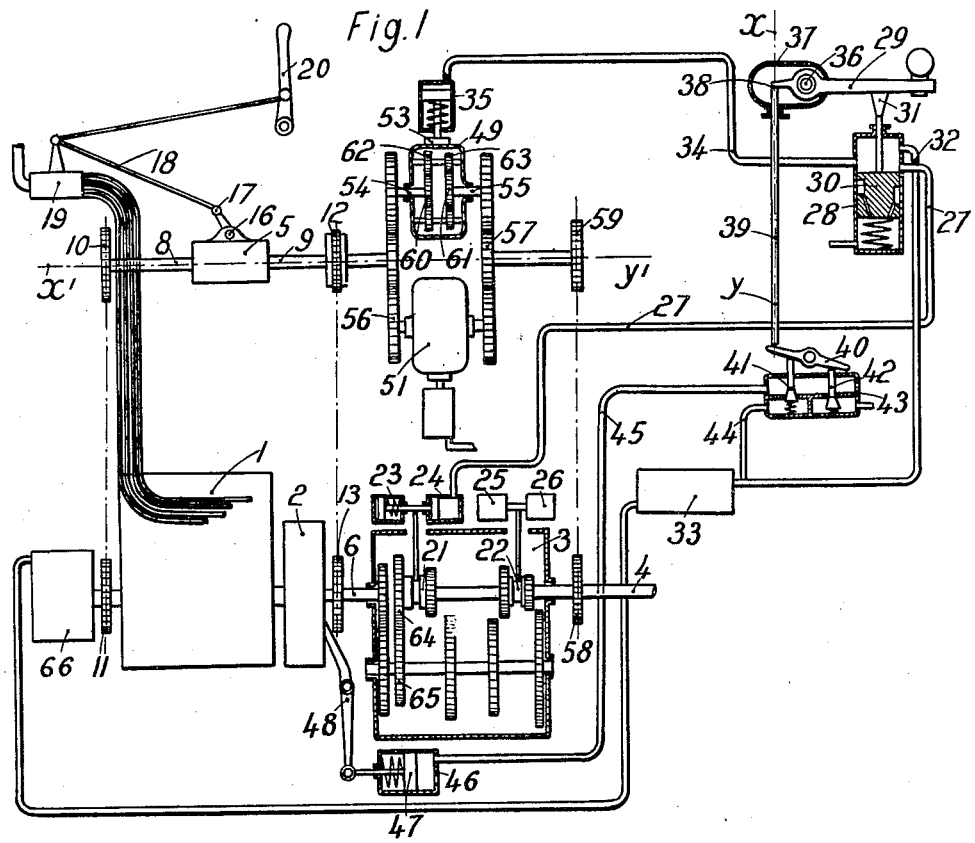
Leon Saives
Inventor
A. M. Bunn
Attorney Patented Apr. 11, 1933

1,903,635

UNITED STATES PATENT OFFICE

LÉON SAIVES, OF BILLANCOURT, FRANCE, ASSIGNOR TO LOUIS RENAULT, OF BILLANCOURT, FRANCE

METHOD OF OPERATING LOCOMOTIVES HAVING INTERNAL COMBUSTION ENGINES

Application filed March 12, 1932, Serial No. 598,524, and in France April 17, 1931.

The invention relates to locomotives or tractors driven by internal combustion engines and deals more particularly with an operating or controlling arrangement for apparatus such as the clutch coupling and change-speed gear.

In high power locomotives driven by internal combustion engines of the Diesel type it is necessary to combine the engine with the auxiliary apparatus in order to arrange for starting and varying the speed. The most commonly adopted method is to combine the engine with an electrical apparatus. In this case the engine drives a generator, the current from which is supplied to the motors driving the axles.

This system is very complicated and the overall efficiency is very much reduced since the power transmitted to the wheel rims is equal to the power of the motor multiplied by the generator efficiency and by the efficiency of the motors.

The ideal arrangement would be, of course, to transmit the engine power by means of members of a purely mechanical nature as is actually done in the case of motor cars, but in view of the masses of the moving members, it is not possible to carry out speed changes in the same manner as that adopted for a motor vehicle owing to the shocks and stresses set up in the transmission gear if at the moment of changing speed, the members which have to engage with one another do not run at exactly the same speed.

The arrangement described herewith has for its object to provide in locomotives driven by internal combustion engines an entirely mechanical system of control which comes into operation when the members which have to engage with one another have exactly the same speed, in such a manner that no shocks are imparted to the transmission gear.

In the accompanying drawing:
Fig. 1 shows the arrangement diagrammatically,
Fig. 2 is a plan view of the preparatory apparatus,
Fig. 3 is a longitudinal section of the synchronizer.

Referring to Fig. 1, 1 is the engine, 2 is the clutch, 3 is the change-speed gear box of the sliding gear type for four speeds, 4 is the transmission shaft which transmits the movement to the axles by suitable mechanical means of known form.

An apparatus referred to as a synchronizer is shown at 5, the purpose of which is to drive the engine so that it always rotates at the same speed as the control shaft 6, even when this latter shaft is uncoupled and is no longer driven by the engine.

The synchronizer is shown in section in Fig. 3. It comprises a box 7 supporting two shafts 8 and 9; the shaft 8 is driven by the engine through the intermediary of chain wheels 10 and 11 (Fig. 1) and the shaft 9 is driven by the control shaft by means of two chain wheels 12 and 13, one of the wheels being driven by friction (the wheel 12 for example), the ratio of the wheels 10/11 being equal to the ratio of the wheels 12/13.

The end of the shaft 8 has a screw thread and the end of the shaft 9 is provided with grooves.

An intermediate member 14 is screwed to the shaft 8 by its left-hand end, whilst its right-hand end is driven by the shaft 9. The exterior of the member 14 is provided with a toothed rack section and a sector 15 pivoted around the axis 16 engages with these teeth; the other end 17 drives the fuel feed pumps by means of the small connecting rod 18, as shown diagrammatically at 19 (Fig. 1).

Furthermore, a lever 20 enables the pump output to be regulated by hand also.

In view of the foregoing it will be noted that when the engine is uncoupled, if the control shaft 6 and the engine are rotating at the same speed, the shafts 8 and 9 will likewise rotate at the same speed and the member rotating with the shafts will not change its position in the box.

If one of the shafts, the shaft 9 for example, rotates at a lower speed than the shaft 8, the member 14 will be unscrewed and will advance to the right, moving the sector 15 which acts upon the engine fuel supply to decrease the output and slow up the engine until the two speeds of the shafts 8 and 9 are equal; at this moment the engine will rotate at the same speed as the control shaft.

If on the other hand the shaft 9 rotates at a higher speed than the engine the member 14 will be screwed along the shaft 8 and the sector 15 will act in a direction opposite to that previously described, increasing the fuel supply until the two shafts rotate at the same speed.

In consequence of the synchronizing apparatus therefore, the engine when uncoupled will always rotate at the same speed as the control shaft. The clutch can thus be caused to re-engage without any shock.

A hand lever 20 permits the driver to control the fuel supply according to requirements.

The arrangement for effecting the change of speed without shock will be described herewith. This comprises a gear box of the sliding gear type for four speeds, the two sliding gears 21 and 22 being operated by compressed air pistons located in the cylinders 23, 24, 25, 26 and maintained in the dead position by buffer springs in the manner shown diagrammatically in Fig. 1.

Each of these cylinders is connected by a pipe 27 to a distributor 28. Thus there are four similar distributors which are disposed concentrically around the axis $x$—$y$ of the control lever 29. Each distributor consists of an outer cylinder 28 in which a piston 30 moves, the rod of which is actuated by a finger 31 on the control lever 29, a buffer spring placed at the lower part of the cylinder maintaining the piston in constant contact with the finger 31.

Three pipes enter the cylinder at three different levels:

1. A pipe 32 at the top, which comes from a compressed air reservoir 33.
2. A pipe 34 which feeds a cylinder 35 referred to further on.
3. A pipe 27 which feeds the cylinder 24.

The piston 30 which is shown in its lower position places the compressed air reservoir 33 in communication with the cylinders 24 and 35. This piston is provided at its periphery with ducts which, when the piston is at the upper part of the cylinder, place the pipes 32 and 34 in communication with the lower part of the cylinder 28 which is in communication with the atmosphere.

The control lever 29 is articulated at 36 on a member 37 which can pivot around the axis $x$—$y$. The end 38 of this lever actuates a rod 39 connected to a lever 40 which controls the two valves 41 and 42 for the box 43, these valves being urged by springs to press against the lever 40. The lower left-hand portion of this box communicates by means of the pipe 44 with the compressed air reservoir 33; the lower right-hand part communicates with the atmosphere and the upper part communicates through the pipe 45 with a cylinder 46, the piston 47 of which controls the declutching through the medium of a lever 48, this piston being urged to the right by a buffer spring.

Fig. 1 shows the valve 41 closed and the valve 42 open; the cylinder 46 is therefore in communication with the atmosphere and as no force is acting upon the lever 48, the shaft 6 is clutched to the engine.

The general arrangement is completed by an apparatus referred to as the "preparatory apparatus", the purpose of which is to impart the desired speed to the control shaft 6, in order to obtain a change of speed without any shock.

For a four-speed gear box, such as is shown diagrammatically in the drawing, the preparatory apparatus comprises four small cylindrical boxes 49, 50, 51 and 52 arranged around an axis $x'$—$y'$, the outside of these boxes being rounded to adapt them to the action of a brake 53 capable of bringing them to rest. Each of these small boxes supports at its centre two opposed shafts 54 and 55 which are driven outside the box by gear wheels 56 and 57 which receive their motion from the shaft 6 through the chain wheels 12 and 13, and from the transmission shaft 4 through the chain wheel 58 and 59 respectively, so that the shaft 54 rotates at the speed of the shaft 6 and the shaft 55 rotates at the speed of the shaft 4, or, the shafts 54 and 55 rotate at speeds proportional to the speeds of the shafts 6 and 4.

Within the boxes the shafts 54 and 55 carry planet gears 60 and 61 engaging with the pinions 62 and 63. The diameters of these wheels and pinions are so selected that when the box is brought to rest by the brake shoe 53 mounted on the piston of the cylinder 35, the speed ratio of the shafts 54 and 55 is equal to the speed ratio of the shafts 6 and 4 when the sliding gear 64 engages with the intermediate gear 65 in the change-speed gear box 3; for each speed of the vehicle a corresponding box is provided in the preparatory apparatus similar to that described above.

To complete the description, an air compressor 66 driven by the engine maintains a constant air pressure in the reservoir 33.

In the arrangement thus described the method of operation, in passing from one speed to another, is as follows:

The driver raises the control handle 29. The first result of this movement is to operate the valves 41 and 42 which causes the piston 47 to move to the left and thus effects the uncoupling of the engine.

It should be noted that, having been declutched, the engine and shaft 6 rotate at the same speed in consequence of the action of the synchronizer 5 which regulates the engine speed in accordance with that of the shaft 6.

The second result of raising the controller 29 is to allow the piston 30 to rise again in the cylinder 28 and to place the cylinder 24 in communication with the atmosphere which brings the sliding gear 21 back to the dead point, and finally when the control lever has been moved to the highest position, the cylinder 35 is placed in communication with the atmosphere and the piston 53 ceases to exercise its braking action on the rotating box of the preparatory apparatus; at this moment everything is free, the engine is uncoupled, all the sliding gears in the gear box are at the dead point and all the rotating boxes for the preparatory apparatus are running idle.

The driver turns the lever 29, and brings it down on the new speed selected which in order to facilitate the description, may be assumed to be that corresponding to the diagram shown in Fig. 1.

The first time the lever 29 descends its stop presses down the distributing piston 30 and drives the compressed air into the pipe 34, thereby putting the cylinder 35 under pressure and arresting the box of the preparatory apparatus corresponding to the speed selected with the result that the two gears 64 and 65 rotate as if they had engaged.

On the second descent of the piston 30 the compressed air is driven into the pipe 27, the cylinder 24 is placed under pressure and the piston in the cylinder 24 moves the sliding gear 21 to cause the sliding pinion 64 to engage with the intermediate pinion 65, which can be effected without shock as the two gears have the same linear speed.

On continuing to press the button of the lever 29, the rod 39 rises, the valve 42 leaves its seat and the valve 41 closes. As the cylinder 46 is no longer under pressure, coupling takes place without any shock since the engine always rotates at the same speed as the shaft 6.

In this way, therefore, by a very simple manipulation passage from one speed to another is obtained without any shock.

It is to be understood that the different members referred to are described merely by way of example and they may be constructed in other ways provided that the result attained is the same.

For example, the synchronizer may comprise a differential movement in which the rotating part carrying the pinions becomes stationary when the speeds of the two shafts carrying the planet wheels are equal and of opposite direction; it might also consist of two groups of centrifugal members driven by the shafts 8 and 9, and which assume a position of equilibrium when the speeds of these shafts are equal, or further, of a combination of any other known means which determine the position of equilibrium when the movement of the two shafts is equal.

Similarly, a compressor has been mentioned as the member for supplying the energy for controlling the clutch, the preparatory apparatus and the speed gear box. Whilst retaining the same principle, a vacuum pump may be employed in place of the compressor, the pistons being actuated by the effect of vacuum in place of compressed air.

Finally, the operation may also be carried out by electricity, either by electro-magnets, or by small motors which drive the different members to be controlled.

Where the engine is of the explosion type, the synchronizer will control the carburettor valve which is connected on the other hand to the accelerator pedal.

I claim:

1. Control mechanisms for locomotives or tractors, comprising a motor and its shaft, a clutch, a second shaft driven by said motor shaft through said clutch, a transmission shaft, a change-speed box carrying movable gears adapted to transmit motion from said driven shaft to said transmission shaft, means acting upon the fuel supply of said motor and adapted to equalize, at each instant, the speeds of said motor shaft and of said driven shaft, means for connecting said driven shaft and said transmission shaft with a motion reduction corresponding to the gear to be engaged in said change-speed box, a control lever adapted for movement to as many operative positions as the change-speed box has speeds, means for simultaneously transmitting the control of said lever, for each of its positions with respect to said clutch, to said movable gears of the change-speed box, and to said means for connecting together said driven shaft and said transmission shaft, with a suitable motion reduction.

2. A controlling arrangement as claimed in claim 1, in which said means acting upon the fuel supply comprise a shaft connected to said motor shaft and a shaft connected to the driven shaft, a screw engaged on one of said last two shafts, driven by the other and provided on its exterior surface with grooves engaging a toothed sector connected to the fuel supply.

3. A controlling arrangement as claimed in claim 1, in which said means for connecting together said driven shaft and said transmission shaft with a motion reduction corresponding to the gear to be engaged in the change-speed box comprise a number of boxes equal to the number of speeds in said change-speed box, each of said boxes containing planet gears in engagement with two sun gears connected respectively to said driven shaft and to said transmission shaft and means for braking the one of said boxes corresponding to the gear to be engaged in the change-speed box.

4. A controlling arrangement for locomotives or tractors, comprising a motor with its shaft, a clutch, a shaft driven by said motor shaft by the intermediary of said clutch, a transmission shaft, a change-speed box transmitting motion from said driven shaft to said transmission shaft, means acting upon the fuel supply of said motor for equalizing at each instant the speeds of said motor shaft and of said driven shaft, a number of boxes equal to the number of speeds on said change-speed box, each of said boxes containing planet gears in engagement with two sun gears connected respectively to said driven shaft and to said transmission shaft, a pneumatic brake on each of said boxes controlled by a piston movable in a cylinder for each brake, said piston controlling together the change-speed box for engaging the speed corresponding to the brake which is operated, a controller device for acting on one of said pistons and means for disengaging automatically said clutch when the controller is disengaged from one piston and for reengaging automatically said clutch when the controller is reengaged with another piston.

In testimony whereof he has signed this specification.

LÉON SAIVES.